No. 698,407. Patented Apr. 22, 1902.
P. L. MALICET & E. E. BLIN.
STEERING GEAR FOR VEHICLES.
(Application filed Nov. 29, 1901.)
(No Model.)
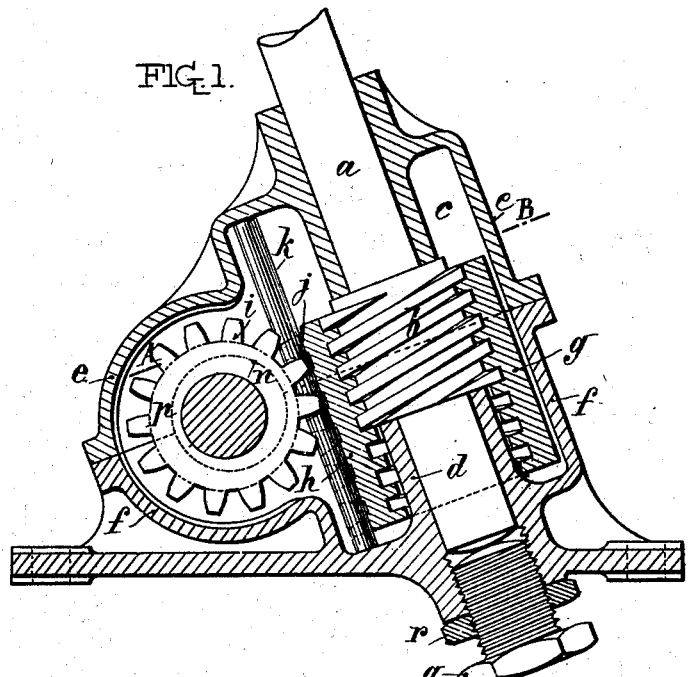
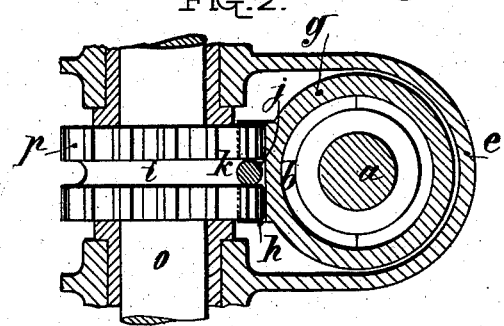
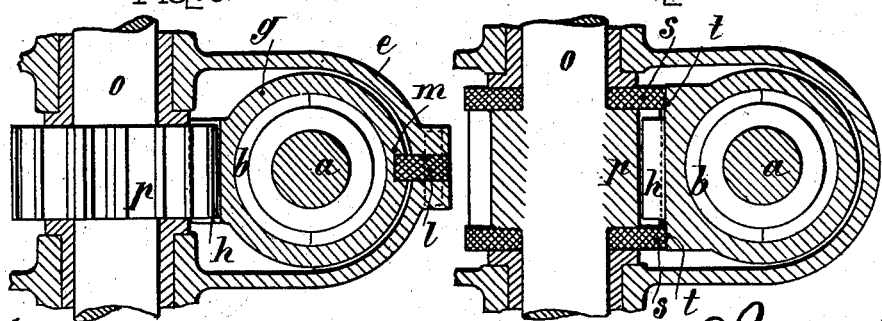

UNITED STATES PATENT OFFICE.

PAUL LUCIEN MALICET AND EMILE EUGÉNE BLIN, OF AUBERVILLIERS, FRANCE, ASSIGNORS TO LA SOCIÉTÉ ANONYME DES ÉTABLISSEMENTS MALICET ET BLIN.

STEERING-GEAR FOR VEHICLES.

SPECIFICATION forming part of Letters Patent No. 698,407, dated April 22, 1902.

Application filed November 29, 1901. Serial No. 84,104. (No model.)

*To all whom it may concern:*

Be it known that we, PAUL LUCIEN MALICET and EMILE EUGÉNE BLIN, citizens of the Republic of France, residing at Aubervilliers, Seine, France, have invented certain new and useful Improvements in or Relating to Steering-Gear for Vehicles, (for which application for Letters Patent has been made in Great Britain under No. 22,970, dated November 13, 1901; in France, dated August 29, 1901, and in Belgium, dated November 14, 1901,) of which the following is a specification.

The present invention relates to a new arrangement of steering-gear particularly applicable to motor-vehicles, whereby the steering-wheels of the vehicle are entirely uninfluenced by any extraneous forces, shocks, or vibrations which the wheels may undergo.

In order to make the nature of our invention well understood, the latter is represented by way of example in the accompanying drawings.

Figure 1 is a vertical section through the steering-spindle. Fig. 2 is a plan, partly in section, on the line A B of Fig. 1. Figs. 3 and 4 are modifications of the device represented in Figs. 1 and 2.

In this steering-gear the steering-spindle $a$ turns an endless screw $b$, which is held in position in its bearings $c\ d$, formed by joining the two parts $e$ and $f$ of the box containing the steering mechanism. On this screw $b$, the threads and pitch of which can be of any desired number, is mounted a nut $g$, to which a longitudinal movement can be given in relation to the steering-spindle $a$, but which cannot turn around the said spindle. This nut $g$ carries a rack $h$, formed or arranged to follow one of its generating-lines, which gears with a pinion $p$, the spindle $o$ of which by any suitable transmission-gear governs the direction of the wheels of the vehicle. The rack $h$ and the pinion $p$ may be provided with straight, helical, or other shaped teeth.

The means for guiding the nut $g$ in its to-and-fro movement in order to prevent it from turning around the spindle $a$ can be of any description, the following devices being only given by way of example.

The first arrangement, Figs. 1 and 2, consists in providing a circular groove $i$ on the periphery of the pinion $p$ and on the rack $h$ a corresponding straight groove $j$ and in placing in the latter groove a pin $k$, the ends of which rest against the casing containing the steering mechanism. In consequence of this arrangement when the worm or screw $b$ is rotated the nut, as it cannot turn, by reason of the rod $k$, rises or descends, actuating in its turn the pinion $p$ by means of the rack $h$, the said pinion causing its spindle $o$ to rotate in the desired direction. It is evident that the pin $k$ instead of being straight could be circular and be mounted either partially or entirely in the toothed part of the pinion.

A modification of the nut portion of the steering mechanism above described consists in arranging in the box itself a guide $l$, Fig. 3, which engages a longitudinal groove $n$, provided in the thick part of the nut $g$.

A second modified form of guiding mechanism for the nut $g$ consists in arranging on each side of the pinion $p$ washers or collars $s$, Fig. 4, the external peripheries of which are in contact with the lateral portions $t$ of the nut $g$ on each side of the rack $h$ on the nut.

For the purpose of enabling the pinion and rack to be relatively adjusted in a perfect manner when there is play between them we preferably form the bearings of the pinion $p$ of eccentric rings $n$, the external periphery of which is held immovable or clamped by joining and locking the two parts $e$ and $f$ of the box together. A screw $q$, having a locknut $r$, serves as a thrust-bearing for the spindle $a$ and being adjustable serves at the same time to compensate for wear or play of the worm $b$.

From the arrangements above described it can be seen that any outside efforts which might be exerted and the pinion $p$ instead of being directly transmitted to the worm $b$ are taken up by the rack $h$ on the nut $g$, and the latter in consequence of its large contact-surface with the screw $b$ will not transmit to the latter any movement which would be appreciably felt by the hand of the driver.

What we claim as our invention, and desire to secure by Letters Patent, is—

1. In steering-gear for vehicles a steering-spindle provided with a worm-thread, a nut mounted thereon means for driving the nut in a longitudinal non-rotatable direction a longitudinal rack on the outer surface of the nut a pinion engaging therewith and mounted on a steering-rod and an eccentric bearing for said steering-rod substantially as described.

2. In a steering-gear for vehicles a steering-spindle provided with a worm-thread a nut mounted thereon means for driving the nut in a longitudinal non-rotatable direction a longitudinal rack upon the outer surface of the nut a pinion engaging therewith and mounted on a steering-rod, and an adjustable thrust-bearing for the steering-spindle substantially as described.

3. In a steering-gear for vehicles a steering-spindle provided with a worm-thread a nut mounted thereon a longitudinal rack on the outer surface of the nut a pinion engaging therewith and mounted on a steering-rod and washers on said steering-rod bearing against the surface of the nut substantially as and for the purpose specified.

In testimony whereof we have signed our names to this specification in the presence of two subscribing witnesses.

PAUL LUCIEN MALICET.
EMILE EUGÉNE BLIN.

Witnesses:
LOUIS SULLIGER,
EDWARD P. MACLEAN.